US010657816B2

(12) United States Patent
Bostick et al.

(10) Patent No.: US 10,657,816 B2
(45) Date of Patent: May 19, 2020

(54) AUTOMATIC SELECTION OF PARKING SPACES BASED ON PARKING SPACE ATTRIBUTES, DRIVER PREFERENCES, AND VEHICLE INFORMATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/197,625

(22) Filed: Nov. 21, 2018

(65) Prior Publication Data

US 2019/0088127 A1 Mar. 21, 2019

Related U.S. Application Data

(63) Continuation of application No. 14/865,512, filed on Sep. 25, 2015, now Pat. No. 10,169,995.

(51) Int. Cl.
*G08G 1/14* (2006.01)
*G01C 21/34* (2006.01)
(Continued)

(52) U.S. Cl.
CPC ......... *G08G 1/143* (2013.01); *G01C 21/3423* (2013.01); *G01C 21/3685* (2013.01);
(Continued)

(58) Field of Classification Search
CPC .......... G08G 1/141; G08G 1/142; G08G 1/14; G08G 1/146
See application file for complete search history.

(56) References Cited

U.S. PATENT DOCUMENTS 6,650,250 B2 11/2003 Muraki
6,970,101 B1 11/2005 Squire et al.
(Continued)

OTHER PUBLICATIONS

IBM, "Global Positioning System (GPS)—Advanced Parking Space Finder", IPCOM000184321, Jun. 22, 2009, 3 pages.
(Continued)

*Primary Examiner* — Hongmin Fan
(74) *Attorney, Agent, or Firm* — Brian Restauro; Andrew D. Wright; Roberts Calderon Safran & Cole, P.A.

(57) ABSTRACT

A method includes receiving: by a computing device, vehicle identification information for a vehicle that is entering a parking facility; identifying a driver profile and vehicle information based on the vehicle identification information, where the driver profile identifies criteria for scoring and selecting a parking space; determining, by the computing device, attributes of one or more open parking spaces in the parking facility when the vehicle enters the parking facility; scoring, by the computing device, each of the one or more open parking spaces based on the attributes, the driver profile, and the vehicle information; selecting, by the computing device, a particular one of the one or more parking spaces based on the scoring; determining, by the computing device, navigation directions from the vehicle to the selected parking space; and outputting, by the computing device, the navigation directions to a user device or vehicle interface system associated with the driver.

20 Claims, 8 Drawing Sheets

(51) Int. Cl.

| | |
|---|---|
| *G01C 21/36* | (2006.01) |
| *G06K 9/00* | (2006.01) |
| *G06K 9/62* | (2006.01) |
| *G08G 1/015* | (2006.01) |
| *G08G 1/017* | (2006.01) |
| *G08G 1/04* | (2006.01) |
| *G06F 1/16* | (2006.01) |
| *G06F 3/01* | (2006.01) |
| *G06F 3/0488* | (2013.01) |
| *G08G 1/0968* | (2006.01) |

(52) U.S. Cl.
CPC .............. *G06F 1/163* (2013.01); *G06F 1/169* (2013.01); *G06F 3/011* (2013.01); *G06F 3/013* (2013.01); *G06F 3/04883* (2013.01); *G06K 9/00536* (2013.01); *G06K 9/00671* (2013.01); *G06K 9/00771* (2013.01); *G06K 9/6201* (2013.01); *G06K 9/626* (2013.01); *G08G 1/015* (2013.01); *G08G 1/017* (2013.01); *G08G 1/0175* (2013.01); *G08G 1/04* (2013.01); *G08G 1/144* (2013.01); *G08G 1/146* (2013.01); *G08G 1/09685* (2013.01); *G08G 1/096816* (2013.01)

(56) References Cited

U.S. PATENT DOCUMENTS

| | | | | |
|---|---|---|---|---|
| 8,766,818 | B2 | 7/2014 | Gupta et al. | |
| 2003/0074129 | A1* | 4/2003 | Curbow ................. | G01C 21/26 701/523 |
| 2005/0033634 | A1 | 2/2005 | Pugliese, III .......... | G06Q 10/02 705/13 |
| 2005/0096974 | A1* | 5/2005 | Chagoly ................. | G08G 1/14 705/13 |
| 2005/0280555 | A1* | 12/2005 | Warner, IV ............. | G08G 1/14 340/932.2 |
| 2012/0098677 | A1* | 4/2012 | Geelen ................... | G01C 21/32 340/932.2 |
| 2012/0130872 | A1* | 5/2012 | Baughman ............. | G07B 15/02 705/32 |
| 2013/0132102 | A1 | 5/2013 | Andrade et al. | |
| 2013/0222157 | A1* | 8/2013 | Fukushima .......... | G08G 1/0175 340/932.2 |
| 2014/0372155 | A1 | 12/2014 | Wang et al. | |
| 2015/0123818 | A1 | 5/2015 | Sellschopp | |
| 2015/0138001 | A1 | 5/2015 | Davies et al. | |
| 2015/0371541 | A1* | 12/2015 | Korman ................. | G08G 1/147 340/932.2 |

OTHER PUBLICATIONS

True, "Vacant Parking Space Detection in Static Images", 2007, 6 pages.
Terdiman, "This drone tech could lead you to a parking space, so kick and scream no more", http://venturebeat.com/2015/01/16/this-drone-tech-could-lead-you-to-a-parking-space-so-kick-and-scream-no-more/, Jan. 16, 2015, 2 pages.
Crowder et al., "Developing an Intelligent Parking System for the University of Texas at Austin", University of Texas at Austin Center for Transportation Research, Jan. 2001, 71 pages.
Wikipedia, "Intelligent Parking Assist System", https://en.wikipedia.org/wiki/Intelligent_Parking_Assist_System, Accessed Sep. 23, 2015, pages.
Vander Veen, "Drone-Assisted Parking", http://www.govtech.com/fs/Drone-Assisted-Parking.html, Jan. 20, 2015, 12 pages.
Hawery,"Parking space detection based on camera and image processing", https://www.youtube.com/watch?v=8A7vfMP0r7s1, Apr. 3, 2014, 1 page.
Fatsi, "Parking Space Detection with OpenCV and a Raspberry Pi", https://viget.com/extend/parking-space-detection-with-opencv-and-a-raspberfy-pi, Jan. 15, 2014, 5 pages.
Intelligent Parking Systems, https://www.intelligentparkingsystems.com, Accessed Jul. 17, 2015, 2 pages.
ParkingBoxx, http://www.parkingboxx.com/?gclid=COCvvLvr0MMCFQySaQodvroA2Q, Accessed Jul. 17, 2015, 5 pages.
Mell et al., "The NIST Definition of Cloud Computing", NIST, Special Publication 800-145, Sep. 2011, 7 pages.
List of IBM Patents or Patent Applications Treated as Related dated Nov. 21, 2018, 1 page.

\* cited by examiner

AUTOMATIC SELECTION OF PARKING SPACES BASED ON PARKING SPACE ATTRIBUTES, DRIVER PREFERENCES, AND VEHICLE INFORMATION

BACKGROUND

The present invention generally relates to parking space selection systems, and more particularly, to the selection of parking spaces based on parking space attributes, user preferences, and vehicle information.

Finding parking spaces in a parking facility, such as a parking lot or garage, can be a time consuming, frustrating, and also waste fuel. Finding parking spaces is particularly difficult at populated facilities, such as shopping malls, hospitals, grocery stores, restaurants, etc. Also, vehicle congestion in parking facilities can be relatively higher during peak times, thereby increasing the difficulty and problems associated with finding a parking space. Further, finding parking spaces that meet particular requirements is even more difficult. For example, different individuals may prefer different sizes and types of parking spaces, e.g., handicapped spaces, spaces within a closer proximity to elevators or exits, spaces that accommodate larger types of vehicles, etc.

Existing systems may help to reduce the effort in finding parking spaces, such as proximity sensors connected to color-coded lights that notify passing motorists of open spaces in a particular row or floor of a parking facility. However, while existing systems may help a motorist identify an open or available parking space, such systems do not identify whether an available space meets certain criteria that define an individual's preferred type of parking space. Also, existing systems do not provide specific turn-by-turn directions to an open parking space that meets the criteria.

SUMMARY

In an aspect of the invention, a computer-implemented method includes: receiving, by a computing device, vehicle identification information for a vehicle that is entering a parking facility; identifying, by the computing device, a driver profile and vehicle information based on the vehicle identification information, where the driver profile identifies criteria for scoring and selecting a parking space; determining, by the computing device, attributes of one or more open parking spaces in the parking facility when the vehicle enters the parking facility; scoring, by the computing device, each of the one or more open parking spaces based on the attributes, the driver profile, and the vehicle information; selecting, by the computing device, a particular one of the one or more parking spaces based on the scoring; determining, by the computing device, navigation directions from the vehicle to the selected parking space; and outputting, by the computing device, the navigation directions to a user device or vehicle interface system associated with the driver. Determining the navigation directions can advantageously be based on pedestrian and/or vehicle traffic within the parking facility. The pedestrian or vehicle traffic within the parking facility may be predicted based on image data received by a camera device associated with the parking facility. The scoring can further be based on the activity of the driver. The activity of the driver may be based on calendar events or social media activity associated with the driver.

In an aspect of the invention, there is a computer program product for selecting a parking space and providing navigation direction to the selected parking space. The computer program product includes a computer readable storage medium having program instructions embodied therewith. The program instructions are executable by a computing device to cause the computing device to: receive vehicle identification information for a vehicle that is entering a parking facility; identify a driver profile and vehicle information based on the vehicle identification information, where the driver profile identifies criteria for scoring and selecting a parking space; determine attributes of one or more open parking spaces in the parking facility when the vehicle enters the parking facility; score each of the one or more open parking spaces based on the attributes, the driver profile, and the vehicle information; output information regarding the scored one or more open parking spaces; determine navigation directions from the vehicle to a selected parking space, of the one or more open parking spaces, wherein the determining the navigation directions is based on pedestrian or vehicle traffic within the parking facility; and output the navigation directions to a user device or vehicle interface system associated with the driver. The pedestrian or vehicle traffic within the parking facility may be predicted based on image data received by a camera device associated with the parking facility. The scoring can further be based on the activity of the driver. The activity of the driver may be based on calendar events or social media activity associated with the driver.

In an aspect of the invention, a system includes: a CPU, a computer readable memory and a computer readable storage medium associated with a computing device; program instructions to receive image data associated with the parking facility; program instructions to receive vehicle identification information for a vehicle that is entering a parking facility; program instructions to identify a driver profile and vehicle information based on the vehicle identification information, where the driver profile identifies criteria for scoring and selecting a parking space; program instructions to identify the one or more open parking spaces based on the image data when the vehicle enters the parking facility; program instructions to determine attributes of the one or more open parking spaces; program instructions to score each of the one or more open parking spaces based on the attributes, the driver profile, and the vehicle information; program instructions to receive a selection of a particular one of the one or more parking spaces based on the scoring; program instructions to determine navigation directions from the vehicle to the selected parking space, wherein the determining the navigation directions is based on pedestrian or vehicle traffic within the parking facility; and program instructions to output the navigation directions to a user device or vehicle interface system associated with the driver. The program instructions are stored on the computer readable storage medium for execution by the CPU via the computer readable memory. The program instructions to determine the attributes of the one or more open parking spaces may advantageously include program instruction to determine the attributes of the one or more open parking spaces based on the image data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
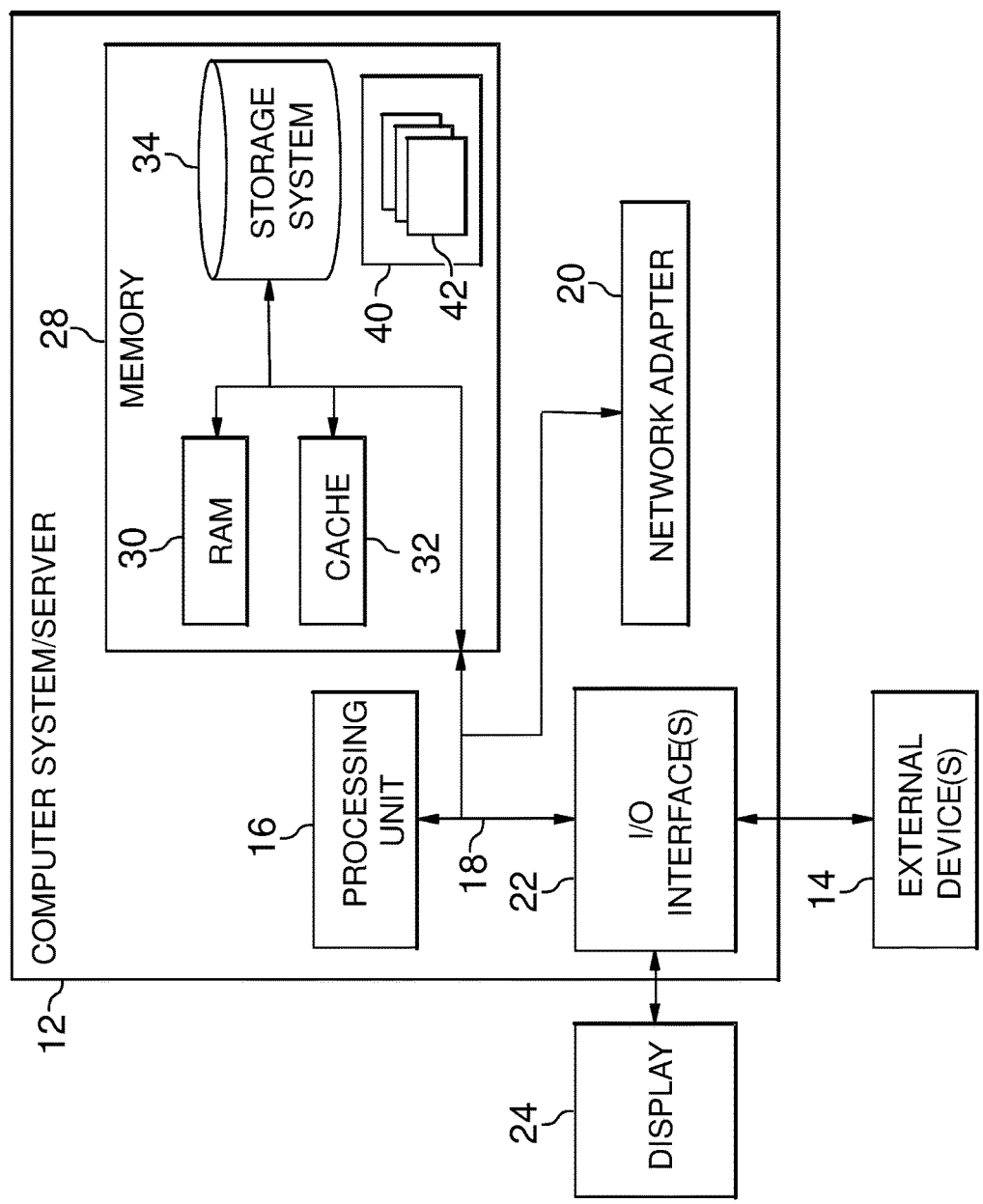
FIG. 1 depicts a cloud computing node according to an embodiment of the present invention.

The present invention generally relates to parking space selection systems, and more particularly, to the selection of parking spaces based on parking space attributes, driver preferences, and vehicle information. Further, navigation directions can be provided to direct the driver to the selected spot based on current traffic and/or predictive traffic patterns existing within the parking facility. Advantageously, selection of parking spaces can be individualized for specific drivers and vehicles, and the driver can be efficiently directed to a selected parking space, thereby saving the driver substantial amounts of time and fuel.

In accordance with aspects of the present invention, a parking space may be automatically selected for a particular user or driver entering a parking facility in a vehicle, e.g., a parking lot or garage. For example, a driver profile can be obtained based on vehicle identification information obtained when the vehicle enters the parking facility. In embodiments, the vehicle identification information can be obtained via a radio frequency ID (RFID) device implemented within the vehicle, or via optical character recognition (OCR) techniques that identify a license plate or vehicle identification number (VIN) of the vehicle. Advantageously, selection of parking spaces can be performed with minimal to no driver activity or interaction.

Further, open or available parking spaces may be identified using cameras provided throughout the parking facility, e.g., cameras that may already be installed in the parking facility for other purposes, such as security monitoring, etc. Additionally, or alternatively, the open or available parking spaces may be identified from image data associated with satellite images, images captured by aerial cameras, etc. For each open parking space, attributes of the open parking space may be identified, such as the size of the parking space, whether the parking space is reserved for handicapped drivers, the proximity of the parking space to particular stores, stairs elevators, or other occupied parking spaces, whether the parking space is a parallel parking space, a non-parallel parking space, or an "angled" parking space, etc. The open parking spaces may be scored based on their attributes, and based on information in the driver profile. For example, the driver profile may identify criteria, such as vehicle size, driver needs, driver interests, driver preferences, driver historical parking space choices, etc.

In addition to, or in the alternative of the driver profile, driver activity information may be used to identify potential attributes of parking spaces for the driver, (e.g., information identified in the driver's calendar, published shopping lists, social media activity, etc.) For example, if the driver's activity indicates that the driver is planning on shopping at a particular store, parking spaces in closer proximity to the particular score are scored relatively higher than those that are relatively farther away from the particular store. That is, the driver's activity may indicate a destination for the driver, and parking spaces in closer proximity to the driver's destination will be scored higher than those that are farther from the driver's destination.

Based on scoring the open parking spaces, a particular parking space, e.g., the parking space with the highest score, can be selected for the driver. Advantageously, the best suited parking space for a particular driver can be selected so that other parking spaces better suited for other drivers can remain available to those drivers.

In alternative embodiments, the driver's historical parking space choices may be used to build the driver's profile without the need for the driver to manually select their parking space preferences. Also, in certain embodiments, information identifying parking spaces in which the driver has previously parked may be solely used to score the open parking spaces. As such, parking spaces most closely matching the attributes of those spaces in which the driver has historically parked are scored relatively higher. Further, the attributes against which to score open parking spaces may dynamically update based on the attributes of parking spaces in which the driver selects to park over time.

Navigation directions for the selected parking space can then be provided to a user device, e.g., a smart phone or similar device, owned by the driver, and/or to the driver's vehicle interface system, e.g., vehicle navigation system. The navigation directions may be based on the shortest distance from the driver's vehicle to the open parking space. Further, the navigation directions can be based on other vehicles driving in the driving facility. For example, the navigation directions can direct the driver to avoid areas in the parking facility that are congested or may be difficult to access due to vehicle traffic in the parking facility. Also, vehicle and/or pedestrian traffic patterns can be predicted based on image data, and the predicted vehicle and/or pedestrian traffic patterns can be used to provide more efficient navigation directions. Advantageously, less time is spent when driving to a parking space.

As described herein, existing systems do not solve the technical problem of finding a parking space meeting particular criteria, and further, directing a driver to the parking space that meets the criteria. In accordance with aspects of the present invention, a parking space that meets particular criteria is selected for a driver, and further, directions to that selected parking space are provided to the driver based on the position of the driver and the position of the parking space. In an alternative embodiment, image data identifying pedestrian and/or vehicle traffic may be used to determine the driving directions. In an alternative embodiment, the vehicle traffic may be based on driving directions provided to drivers of other vehicles. For example, if one driver was directed along a particular route in a parking facility, then driving directions for a subsequent driver entering the parking facility may be such that the subsequent driver avoids the route of the previous driver. In alternative embodiment, a list of candidate parking spaces may be presented along with their respective scores and their respective attributes. A particular candidate spot can then be selected, and navigation directions can be provided to the selected spot.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
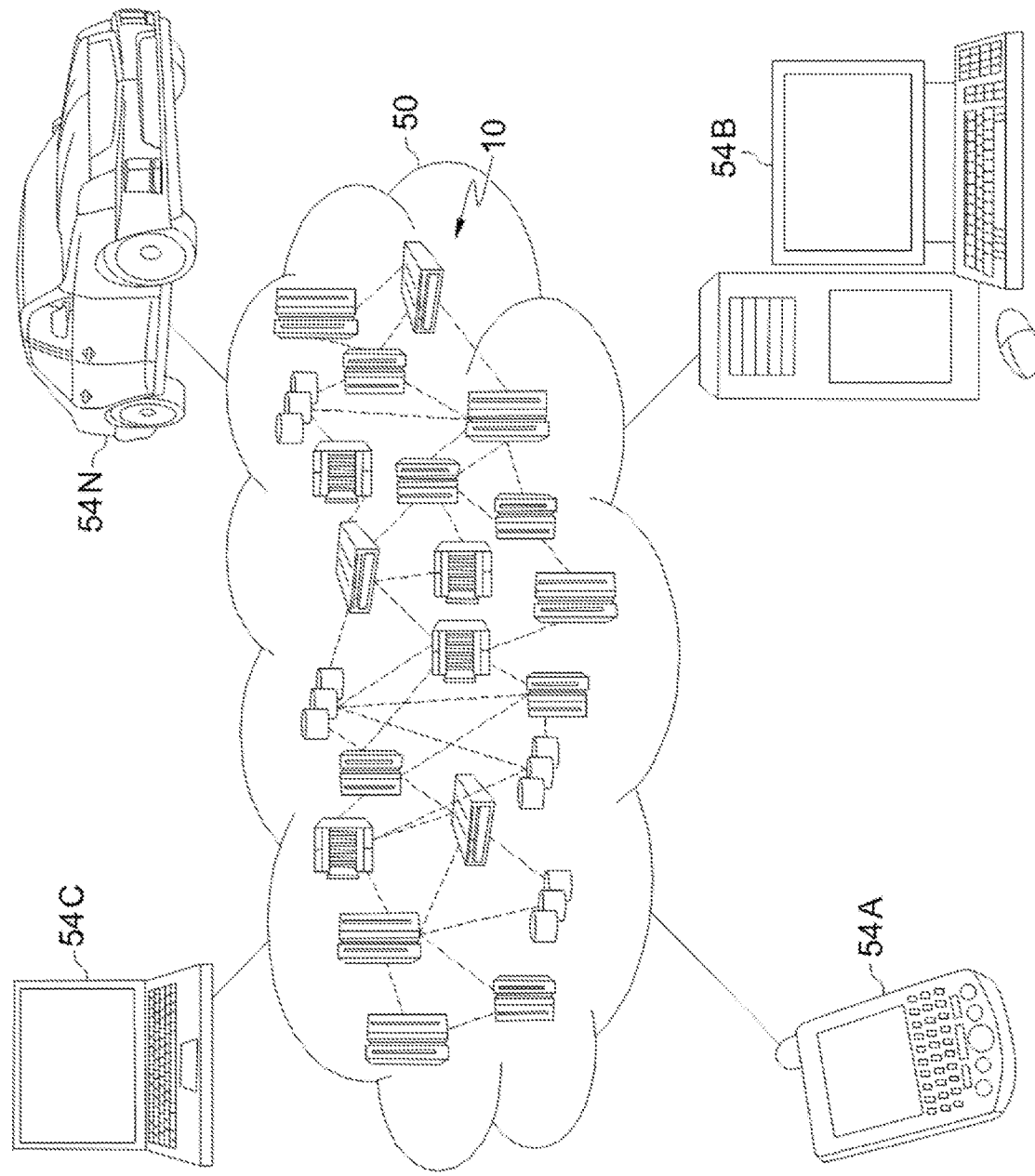
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
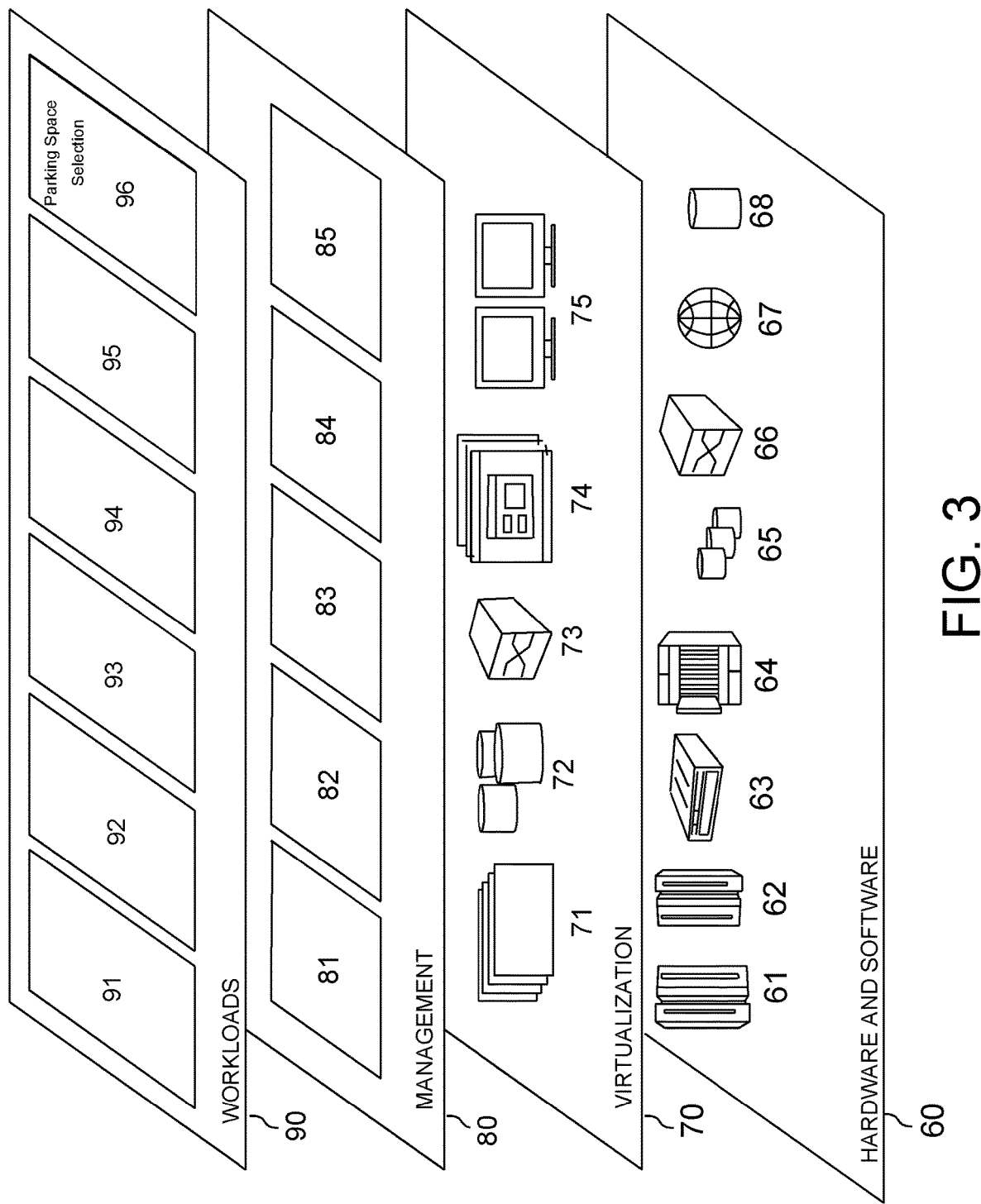
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking space selection 96.

Referring back to FIG. 1, the Program/utility 40 may include one or more program modules 42 that generally carry out the functions and/or methodologies of embodiments of the invention as described herein. Specifically, the program modules 42 may monitor real-time parking facility camera data, receive vehicle identification information for a vehicle entering a parking facility, identify driver and vehicle information based on the vehicle identification information, identify open parking spaces based on the real-time parking facility camera data, determining attributes of the open parking spaces, score the open parking spaces based on the attributes, the vehicle information, and the driver information, select a particular open parking space based on the scoring, determine navigation directions to the selected parking space, and outputting navigation directions and information for the selected parking space, e.g., to a user device of the driver and/or to a vehicle interface system, such as a vehicle navigation system. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4:
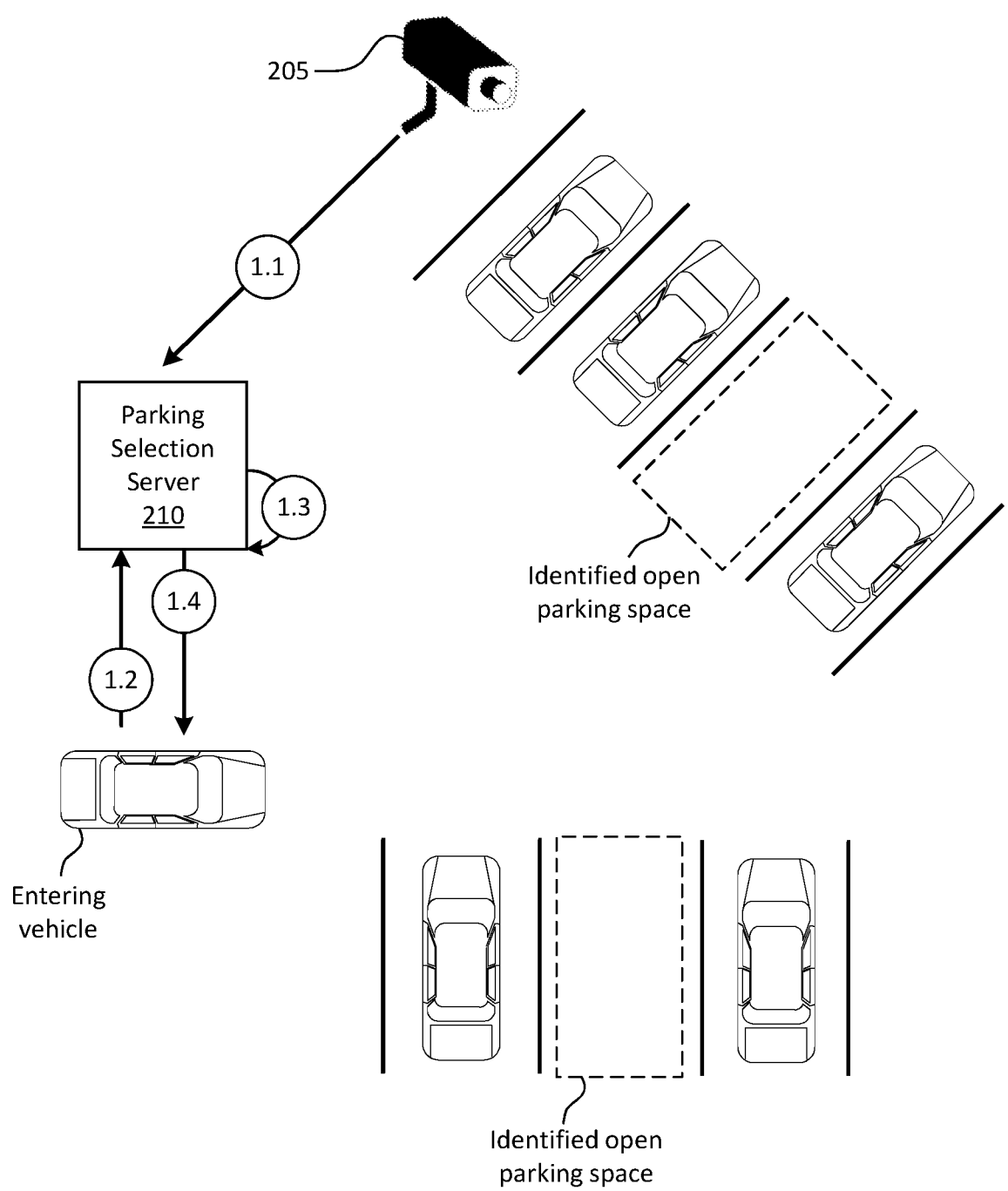
FIG. 4 shows an overview of an example implementation in accordance with aspects of the present invention

FIG. 4 shows an overview of an example implementation in accordance with aspects of the present invention. In FIG. 4, a parking selection server 210 may monitor parking facility image data received from a camera 205 (at step 1.1). In embodiments, the parking selection server 210 may include one more components of computer system/server 12. Based on the received image data, the parking selection server 210 may identify open parking space as shown in FIG. 4. For example, parking selection server 210 may use image classification techniques and/or other image analysis techniques to determine whether a parking space is open. Further, the parking selection server 210 may determine attributes of each identified open parking spaces, e.g., the size of the space, an identifier of the space, the proximity of the parking space to a landmark, e.g., a particular venue or store, stairs, elevators, or other occupied parking spaces, a type of parking space, e.g., a parallel parking space, a non-parallel parking space, an "angled" parking space, a handicapped parking space, etc. Advantageously, the parking selection server 210 selects parking spaces based on their attributes and driver preference to select the best suited parking space for a particular driver.

When a vehicle enters the parking facility, vehicle identification information may be obtained by the parking selection server 210 (at step 1.2). In embodiments, the parking selection server 210 may be connected to an RFID scanner that obtains the vehicle identification information from an RFID device implemented within the vehicle. Additionally, or alternatively, the parking selection server 210 may be connected to a camera that obtains the vehicle identification information via optical character recognition (OCR) techniques that identify a license plate or a vehicle identification number (VIN) of the vehicle. Based on obtaining the vehicle identification information, the parking selection server 210 may obtain a stored driver profile, and score the open parking spaces based on criteria identified in the driver profile and the attributes of the open parking spaces (at step 1.3). For example, as described herein, the driver profile may include criteria, such as vehicle size, driver needs, driver interests, driver preferences, attributes of parking spaces in which the driver has previously parked, etc. Additionally, or alternatively, the driver profile may identify driver activity, such as information identified in the driver's calendar, published shopping lists, social media activity, etc. In addition to, or in the alternative of the driver profile, driver activity information may be used to identify potential attributes of parking spaces for the driver, (e.g., information identified in the driver's calendar, published shopping lists, social media activity, etc.) For example, if the driver's activity indicates that the driver is planning on shopping at a particular store, parking spaces in closer proximity to the particular score are scored relatively higher than those that are relatively farther away from the particular store.

The scoring may be relatively higher for parking spaces whose attributes more closely match the criteria identified in the driver profile. In embodiments, the scoring may be weighted based on different criteria or preferences. As another example, the driver profile may indicate that the driver prefers lower priced parking spaces, and that this preference is higher weighted than the driver's preference for parking spaces in closer proximity to a venue, elevators, or an exit, thus increasing the score for relatively lower priced parking spaces. As another example, the driver profile may indicate that the driver prefers spaces at a closer proximity to a venue, and that this preference is higher weighted than the driver's preference for lower priced parking spaces, thus increasing the score for spaces in closer proximity to the venue. As another example, the driver profile may indicate that the driver requires a handicap space, thus eliminating non-handicap spaces from consideration of selection.

In embodiments the scoring may be based on the driver's activity as identified by the driver's calendar events and/or social media activity. For example, a driver's profile may indicate, e.g., based on social media activity, that the driver is planning on shopping at a particular store in a shopping plaza, thus increasing the score for parking spaces that are closer in proximity to that particular store. As another example, the driver profile may indicate, e.g., based on social media activity and/or a calendar event, that the driver is planning on shopping for a large item, e.g., a television, thus increasing the score for parking spaces that are relatively larger to give the driver more room to load their cargo.

Figure 5:
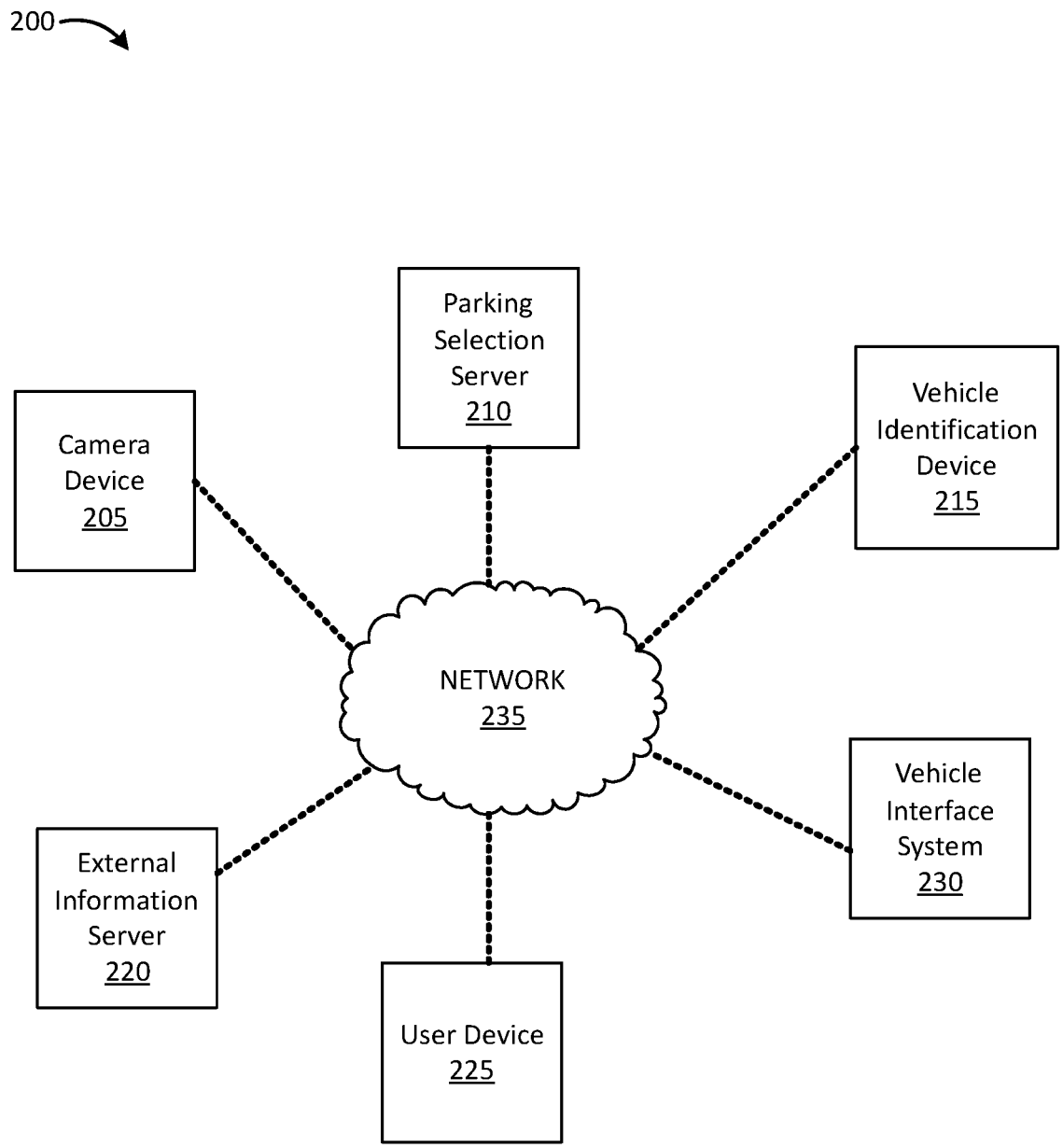
FIG. 5 shows an example environment in accordance with aspects of the present invention.

At step 1.4, the parking selection server 210 may output information identifying the selected parking space, e.g., to a vehicle navigation system and/or to a user device associated with the driver. For example, the parking selection server 210 may output a space number or other identifier of the selected parking space. As described herein, the parking selection server 210 may also output navigation directions to direct the driver to the selected parking space. In embodiments, the navigation directions may be based on the shortest distance from the driver's vehicle to the open parking space. Further, the navigation directions can be based on other vehicles driving in the driving facility. For example, the navigation directions can direct the driver to avoid areas in the parking facility that are congested or may be difficult to access due to vehicle traffic in the parking facility FIG. 5 shows an example environment in accordance with aspects of the present invention. As shown in FIG. 5, environment 200 may include camera device 205, parking selection server 210, vehicle identification device 215, external information server 220, user device 225, vehicle interface system 230, and/or network 235. In embodiments, one or more components in environment 200 may correspond to one or more components in the cloud computing environment of FIG. 2.

The camera device 205 may include a surveillance camera, a satellite camera, an aerial camera, and/or other type of camera device. The camera device 205 may provide camera image data to the parking selection server 210.

The parking selection server 210 may include one or more computing devices that may monitor real-time parking facility camera data, receive vehicle identification information for a vehicle entering a parking facility, identify driver and vehicle information based on the vehicle identification information, identify open parking spaces based on the real-time parking facility camera data, and determining attributes of the open parking spaces. The parking selection server 210 may further score the open parking spaces based on the attributes, the vehicle information, and the driver information, select a particular open parking space based on the scoring. The parking selection server 210 may further determine navigation directions to the selected parking space, and outputting navigation directions and information for the selected parking space, e.g., to a user device of the driver and/or to a vehicle interface system, such as a vehicle navigation system.

The vehicle identification device 215 may include a scanner or other type of device to obtain vehicle identification information from a vehicle entering a parking facility. For example, the vehicle identification device 215 may be an RFID scanner and/or an OCR device that may obtain a VIN, license plate number, and/or other vehicle identification information from the vehicle entering the parking facility. The vehicle identification device 215 may provide the vehicle identification information to the parking selection server 210.

The external information server 220 may include one or more computer devices that store information for a user or driver, such as calendar even information, social media activity, and/or other information that may be used to identify driver activity. The parking selection server 210 may use this information to determine driver activity as in input to a scoring algorithm to score open parking spaces.

The user device 225 may include any device capable of communicating via a network, such as the network 235. For example, the user device 225 may correspond to a mobile communication device (e.g., a smart phone or a personal digital assistant (PDA)), a portable computer device (e.g., a laptop or a tablet computer), or another type of device. In some embodiments, the user device 225 may communicate with the parking selection server 210 to provide driver profile information, such as driver preferences, interests, etc. In some embodiments, the user device 225 may receive information from parking selection server 210 identifying a selected parking space and/or navigation directions to a selected parking space.

The vehicle interface system 230 may include, for example, a vehicle navigation system that receives information from parking selection server 210 identifying a selected parking space and/or navigation directions to a selected parking space. In embodiments, the vehicle interface system 230 may output vehicle identification information to parking selection server 210, e.g., via the vehicle identification device 215.

The network 235 may include network nodes, such as network nodes 10 of FIG. 2. Additionally, or alternatively, the network 235 may include one or more wired and/or wireless networks. For example, the network 235 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 235 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 5. In practice, the environment 200 may include additional devices and/or networks; fewer devices and/or networks; different devices and/or networks; or differently arranged devices and/or networks than illustrated in FIG. 5. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 6:
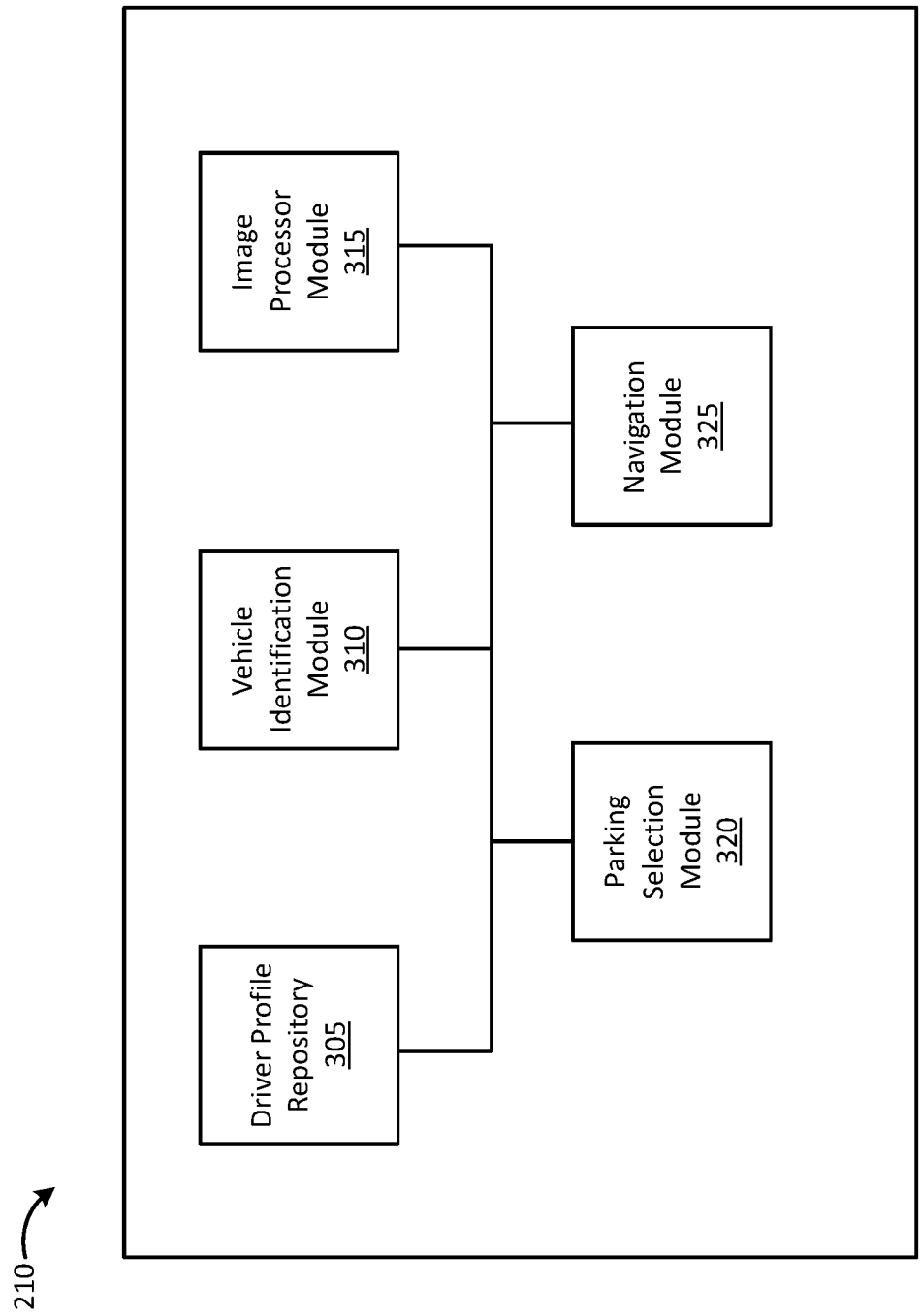
FIG. 6 shows a block diagram of example components of a parking selection server in accordance with aspects of the present invention.

FIG. 6 shows a block diagram of example components of a parking selection server 210 in accordance with aspects of the present invention. As shown in FIG. 6, the parking selection server 210 may include a driver profile repository 305, a vehicle identification module 310, an image processor module 315, a parking selection module 320, and/or a navigation module 325. In embodiments, the parking selection server 210 may include additional or fewer components than those shown in FIG. 6. In embodiments, separate components may be integrated into a single computing component or module. Additionally, or alternatively, a single component may be implemented as multiple computing components or modules.

The driver profile repository 305 may include a data storage device (e.g., storage system 34 of FIG. 1) that stores a driver profile identifying preferences for a driver associated with a particular vehicle. These preferences may include criteria for parking spaces form which parking spaces may be scored and selected for the driver. The preferences may be provided in advance by the driver via a web portal using a computing device, e.g., a desktop computing device, a laptop computing device, a smart phone, a tablet, etc. For example, the driver profile repository 305 may store preferences indicating whether the driver requires a handicap space, whether the driver prefers closer spaces or farther spaces, e.g., if the driver prefers to walk, if the driver prefers spaces that permits the driver to pull forward into the space and pull forward out of the space, etc. In embodiments the driver profile repository 305 may store attributes of parking spaces historically selected for the user and/or attributes of parking spaced in which the user/driver has historically parked. In embodiments the driver profile repository 305 may store weightings for each preference or criteria. For example, the driver profile repository 305 may store weighting information indicating that proximity of a space to a venue is higher weighted than the price of the parking space.

In embodiments, the driver profile repository 305 may store information identifying a user device 225 of the driver, e.g., so that selected parking space information can be provided to that particular user device 225 while the user device 225 is within a border defining a parking facility. Further, the driver profile repository 305 may store information identifying a particular vehicle interface system 230 associated with the driver's vehicle so that selected parking space information can be provided to that particular vehicle interface system 230 while the vehicle is within a border defining a parking facility. In embodiments, the driver profile repository 305 may communicate with the external information server 220 to obtain activity information for the driver.

In embodiments, the driver profile repository 305 may store information regarding the driver's vehicle, e.g., the make, model, and year of the vehicle, the dimensions of the vehicle, and/or other information regarding the vehicle. Also, the driver profile repository 305 may store vehicle identification identifying the vehicle, and the driver profile associated with the vehicle. For example, the driver profile repository 305 may store a data structure that links the driver profile to a VIN, a license plate number, and/or other vehicle identification information. The information stored by driver profile repository 305 may be used to identify a driver profile of a vehicle that has entered a parking facility, and further used to score open parking spaces based on the preferences/criteria included in the driver profile.

The vehicle identification module 310 may comprise a program module (e.g., program module 42 of FIG. 1) that receives vehicle identification information, e.g., from the vehicle identification device 215. Based on receiving the vehicle identification information, the vehicle identification module 310 may provide the vehicle identification information to the parking selection module 320. For example, when a vehicle enters a parking facility, the vehicle identification device 215 may obtain the vehicle identification information, e.g., using an RFID scanner, an OCR device, and/or using other techniques.

The image processor module 315 may comprise a program module (e.g., program module 42 of FIG. 1) that receives real-time image data from one or more camera devices 205. Further, the image processor module 315 may process the image data to identify open parking spaces and attributes associated with the open parking spaces. For example, the image processor module 315 may use pixel-based classification techniques and/or other techniques to identify an open parking space and/or attributes of the open parking space. In embodiments, the image processor module 315 may predict that a parking space is about to open up, e.g., by detecting that an individual has found their vehicle, placed cargo in the trunk of the vehicle, and entered the vehicle. The image processor module 315 may be used to actively track the number and location of open spaces in the parking facility.

In embodiments, the image processor module 315 may identify the parking space and attributes of the parking space in which a particular driver has parked their vehicle, and may provide this information to the driver profile repository, e.g., so that historical parking spaces and attributes of these spaces in which the driver has parked can be later used to better select parking spaces for the driver in the future. In particular, the image processor module 315 may identify that a driver has parked in a selected parking space, or has chosen to park in a different parking space.

In embodiments, the image processor module 315 may determine vehicle and/or pedestrian traffic within a parking facility. As described herein, vehicle and/or pedestrian traffic may be used to provide navigation directions to direct a driver to a particular parking space within a parking facility.

The parking selection module 320 may comprise a program module (e.g., program module 42 of FIG. 1) that selects a parking space for a particular driver based on attributes of open parking spaces and a driver profile. For example, when a vehicle enters a parking facility, the vehicle identification module 310 may provide vehicle identification information to the parking selection module 320. The parking selection module 320 may then communicate with the driver profile repository 305 to determine a driver profile associated with the received vehicle identification information. Further, the parking selection module 320 may identify open parking spaces based on information provided by the image processor module 315. The parking selection module 320 may also obtain attributes of the open parking spaces based on the image data processed by the image processor module 315. In embodiments, attributes of the parking space may be identified using some other technique. For example, the image processor module 315 may determine that a particular space at a particular location is open, and a database storing parking space attributes based on parking space location may be used to identify score the parking space.

The parking selection module 320 may then combine the information in the driver profile with the attributes of the open parking spaces to generate scores for the parking spaces. As described herein, the scores may be based on weightings of each criteria identified in the driver profile such that parking spaces having attributes that meet higher weighted criteria will be scored relatively higher. The parking selection module 320 may then select the parking space having the highest score. Alternatively, the parking selection module 320 may select the top 3, top 5, or other number of candidate spaces and provide a passenger of the vehicle with an opportunity to select a particular parking space of the candidate spaces.

The navigation module 325 may comprise a program module (e.g., program module 42 of FIG. 1) that obtains information identifying the selected parking space (either the space automatically selected by the parking selection module 320 based on the highest score, or the space selected by the passenger after candidate spaces have been presented), and may determine driving directions, e.g., turn-by-turn directions from the vehicle to the parking space. In embodiments, the navigation module 325 may store a map of the parking facility identifying longitude and latitude coordinates of the parking spaces in the parking facility. The navigation module may actively communicate with the user device 225 and/or the vehicle interface system 230 associated with the driver to obtain the real-time location of the driver (e.g., using a global position system of the user device 225 and/or the vehicle interface system 230). The navigation module 225 may compare the location of the driver with the location of the parking space in order to provide the driver with accurate directions to the parking space.

In embodiments, the navigation directions may be based on the closest distance between the driver and the parking space. Additionally, or alternatively, in an alternative embodiment, the directions may be based on vehicle and/or pedestrian traffic present throughout various areas in the parking facility. For example, the directions may avoid congested routes to the parking space. In an alternative embodiment, the vehicle traffic may be based on driving directions provided to drivers of other vehicles. For example, if one driver was directed along a particular route in a parking facility, then driving directions for a subsequent driver entering the parking facility may be such that the subsequent driver avoids the route of the previous driver.

In embodiments, the navigation module 325 may communicate with the image processor module 315 to identify the presence of vehicles, pedestrians, and/or other objects, and the navigation module 325 may determine the directions based on these factors. Additionally, or alternatively, the navigation module 325 may determine driving directions based on directions based on which parking spaces the parking selection module 320 has just selected for a different vehicle. For example, the navigation module 325 may determine driving directions so as to avoid a route in which other vehicles have directed. In embodiments, the directions may direct the driver to turn, e.g., left or right at a particular parking row number, drive straight for a particular distance, or go up or down a level. As an illustrative, non-limiting example, the parking directions may direct the driver to drive up one level to parking row number 1, and park in space number 123.

Figure 7:
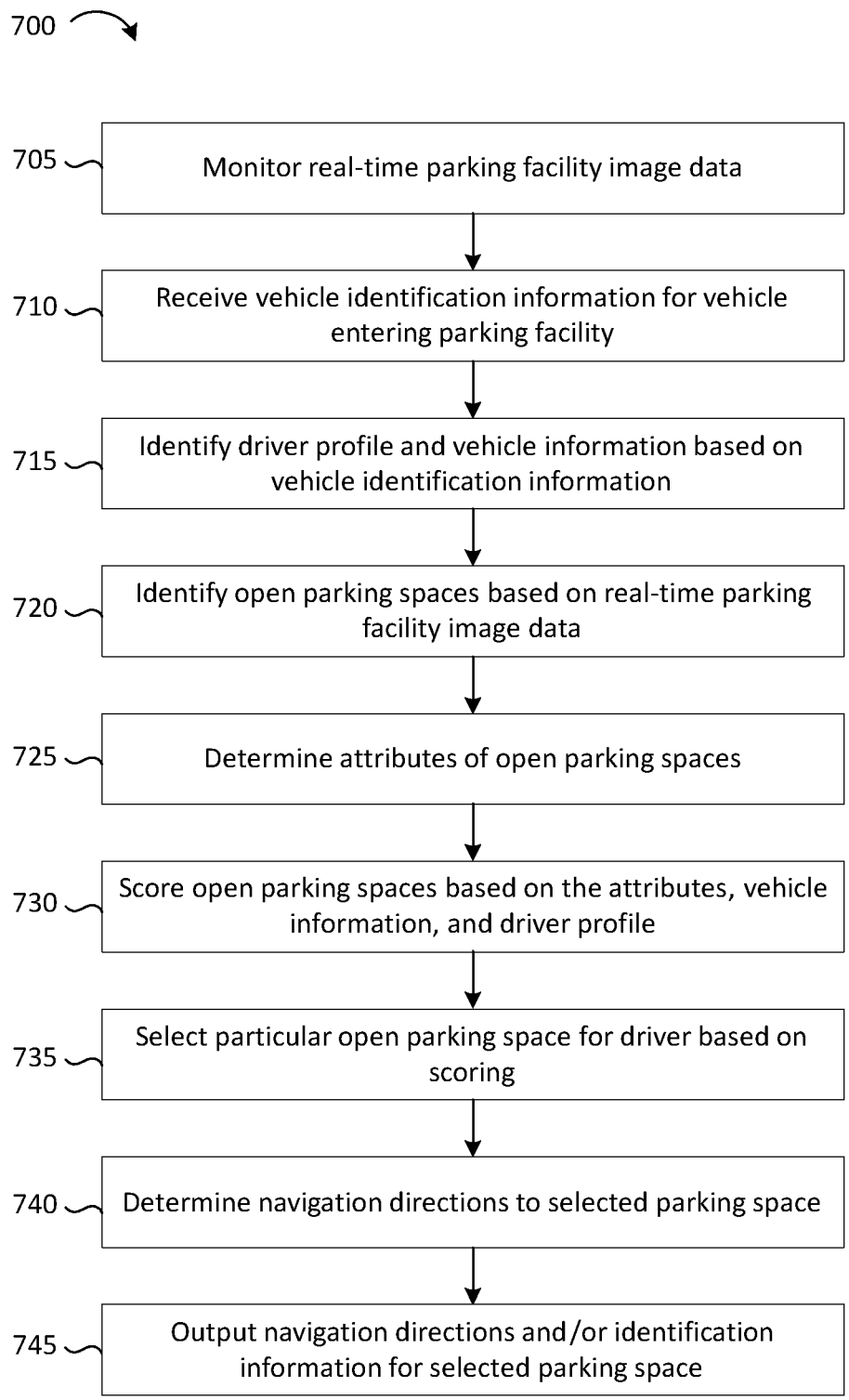
FIG. 7 shows an example flowchart for selecting a parking space based on parking space attributes, driver preferences, and vehicle attributes in accordance with aspects of the present invention.

FIG. 7 shows an example flowchart for selecting a parking space based on parking space attributes, driver preferences, and vehicle attributes. The steps of FIG. 7 may be implemented in the environment of FIG. 1, for example. As noted above, the flowchart illustrates the architecture, functionality, and operation of possible implementations of systems, methods, and computer program products according to various embodiments of the present invention.

As shown in FIG. 7, real-time parking facility image data may be monitored (at step 705). For example, the parking selection server 210 may monitor real-time parking facility image data by receiving image data from one or more camera devices 205 associated with the parking facility. This monitoring is used to track open parking spaces in real time.

At step 710, vehicle identification information for a vehicle entering the parking facility is received. For example, the parking selection server 210 may receive the vehicle identification information from the vehicle identification device 215 as described herein.

At step 715, a driver profile and vehicle information is identified based on the vehicle identification information. For example, parking selection server 210 may look up the vehicle identification information in the driver profile repository to identify the driver profile and the vehicle information based on the vehicle identification information.

At step 720, open parking spaces are identified based on the real-time parking facility image data. For example, as described herein, the parking selection server 210 may use pixel-based classification and/or other techniques to determine open parking spaces based on the image data received from the one or more camera devices 205. Additionally, or alternatively, the parking selection server 210 may receive information identifying open parking spaces from one or more object sensors that identify vacant and occupied parking spaces.

At step 725, attributes of the open parking spaces are determined. For example, the parking selection server 210 may determine the attributes of the open parking spaces based on the image data and using pixel-based classification techniques and/or other techniques. Additionally, or alternatively, the parking selection server 210 may determine the location of the open parking spaces, and map the locations with a database that stores the attributes of the parking spaces based on the location of the parking spaces, e.g., based on longitude/latitude coordinates of the parking spaces.

As described herein, the parking space attributes may include the size of the parking space, whether the parking space is reserved for handicapped drivers, the proximity of the parking space to particular stores, stairs elevators, or other occupied parking spaces, whether the parking space is a parallel parking space, a non-parallel parking space, or an "angled" parking space, etc.

At step 730, the open parking spaces are scored based on their respective attributes, the vehicle information, and the driver profile, e.g., the driver's preferences, interests, activity, etc. For example, for each open parking space, the parking selection server 210 may combine the information in the driver profile with the attributes of the open parking spaces to generate scores for the parking space. As described herein, the scores may be based on weightings of each criteria identified in the driver profile such that parking spaces having attributes that meet higher weighted criteria will be scored relatively higher. For example, if the driver profile indicates that the driver prefers parking spaces closer to a venue greater than less expensive parking spaces, then the parking spaces that are relatively closer to the venue will be scored relatively higher than those that are farther away from the venue.

As described herein, the score may be based on the driver's activity, e.g., as determined based on the driver's social media activity and/or calendar entries. For example, if the driver's activity indicates that the driver will be shopping at a particular store in a shopping plaza, the score of parking spaces closer to that particular store will be scored relatively higher than those that are farther away from that store. Also, the score may be based on the vehicle information such that parking spaces that can better accommodate the size of the vehicle will score relatively higher.

As described herein, the score may be based on the attributes of parking spaces in which the driver has previously parked, and/or the attributes of parking spaces previously selected for the driver. As such, parking spaces most closely matching the attributes of those spaces in which the driver has historically parked are scored relatively higher. Further, the attributes against which to score open parking spaces may dynamically update based on the attributes of parking spaces in which the driver selects to park over time.

At step 735, a particular open parking space is selected for the driver based on the scoring. For example, the parking selection server 210 may automatically select the parking space having the highest score. In an alternative embodiment, the parking selection server 210 may present a list of candidate spaces and their respective attributes to the user device 225 and/or the vehicle interface system of the driver. A passenger of the vehicle may then select a particular candidate spot.

At step 740, navigation directions to the selected parking space are determined. For example, the parking selection server 210 may determine driving directions, e.g., turn-by-turn directions from the vehicle to the parking space. In embodiments, the navigation directions may be based on the closest distance between the driver and the parking space. Additionally, or alternatively, the directions may be based on vehicle and/or pedestrian traffic present throughout various areas in the parking facility, e.g., as determined by the image data being monitored by the parking selection server 210. For example, the directions may avoid congested routes to the parking space.

At step 745, the navigation directions and/or identification information regarding the selected parking space may be output. For example, the parking selection server 210 may output the navigation directions to the user device 225 and/or the vehicle interface system 230 associated with the driver. In embodiments, the parking selection server 210 may actively communicate with the user device 225 and/or the vehicle interface system 230 associated with the driver to compare the location of the driver with the location of the parking space in order to provide the driver with accurate directions to the parking space. In embodiments, the parking selection server 210 may output identification information for the selected parking space, e.g., a space number, so that the driver can self-navigate to the selected parking space.

Figure 8:
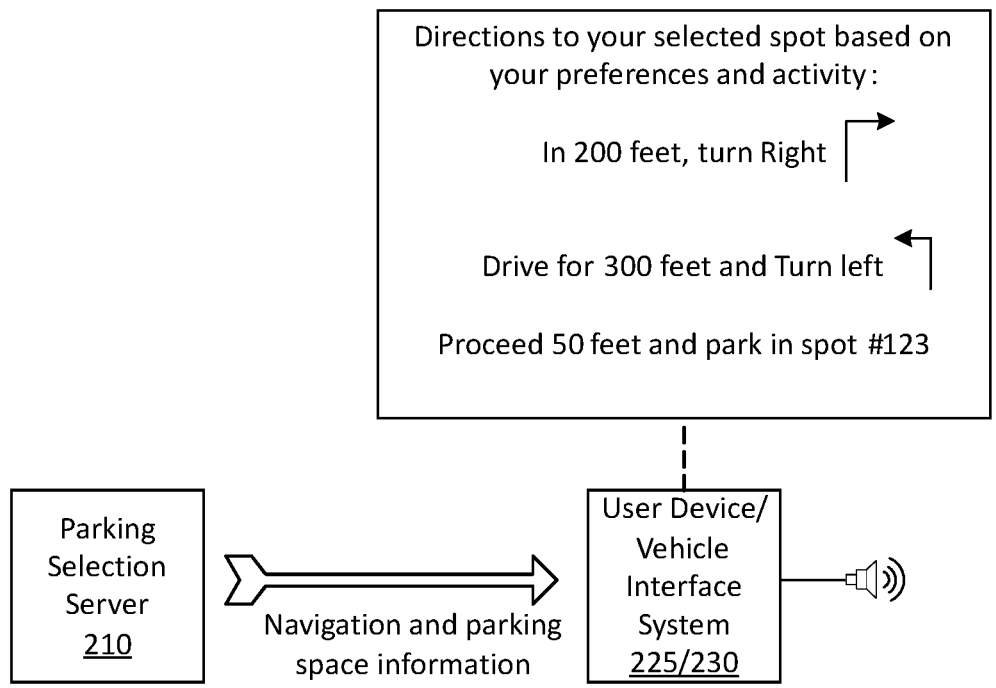
FIG. 8 shows an example user interface in accordance with aspects of the present invention.

FIG. 8 shows an example user interface in accordance with aspects of the present invention. As shown in FIG. 8, the parking selection server 210 may output, to the user device 225 and/or vehicle interface system 230 of the driver, navigation and parking space information for a selected parking space, e.g., in accordance with the process of FIG. 7. Based on receiving the navigation and parking space information, the user device 225 and/or the vehicle interface system 230 may display turn-by-turn directions to the parking space, and may correspondingly provide audible turn-by-turn directions to the parking space. For example, the user device 225 and/or the vehicle interface system 230 may implement an application that displays and/or audibly outputs the received information from the parking selection server 210. In embodiments, the vehicle interface system 230 may provide audible turn-by-turn directions through vehicle speakers.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for dividing power across user devices 210, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, vehicle identification information for a vehicle that is entering a parking facility;
    identifying, by the computing device, a driver profile and vehicle information based on the vehicle identification information, wherein the driver profile identifies criteria for scoring and selecting a parking space;
    determining, by the computing device, attributes of one or more open parking spaces in the parking facility when the vehicle enters the parking facility, wherein the attributes are determined by analyzing image data associated with the parking facility by applying pixel-based classification to the image data;
    scoring, by the computing device, each of the one or more open parking spaces based on the attributes, the driver profile, and the vehicle information, wherein the scoring is further based on a proximity of the one or more open parking spaces to a destination of the driver as identified by activity of the driver;
    selecting, by the computing device, a particular one of the one or more parking spaces based on the scoring; and
    determining, by the computing device, navigation directions from the vehicle to the selected parking space, wherein the navigation directions are based on the image data and navigation directions previously provided to a different vehicle.

2. The computer-implemented method of claim 1, further comprising:
    outputting, by the computing device, the determined navigation directions to a user device or vehicle interface system associated with the driver.

3. The computer-implemented method of claim wherein determining the navigation directions is based on pedestrian or vehicle traffic within the parking facility.

4. The computer-implemented method of claim 3, wherein the pedestrian or vehicle traffic within the parking facility is determined based on the image data, wherein the image data is received by a camera device associated with the parking facility.

5. The computer-implemented method of claim 1, further comprising:
    receiving the image data; and
    identifying the one or more open parking spaces based on the image data,
    wherein determining the attributes of the one or more open parking spaces is based on identifying the one or more open parking spaces.

6. The computer-implemented method of claim 1, wherein the scoring is based on weightings of the criteria identified in the driver profile.

7. The computer-implemented method of claim 1 wherein the criteria or the attributes of each of the one or more parking spaces identifies at least one selected from the group consisting of:
    a size of the parking space,
    an identifier of the parking space,
    a proximity of the parking space to a particular landmark,
    occupied parking spaces, and
    a type of the parking space.

8. The computer-implemented method of claim 1, wherein the activity of the driver is based on at least one selected from the group consisting of: calendar events, and social media activity associated with the driver.

9. The computer-implemented method of claim 1, wherein a service provider performs at least one selected from the group consisting of: creates the computing device, maintains the computing device, deploys the computing device, and supports the computing device.

10. The computer-implemented method of claim 1, wherein steps of claim 1 are provided by a service provider on at least one selected from the group consisting of: a subscription basis, an advertising basis, and a fee basis.

11. The computer-implemented method of claim 1, wherein the computing device includes software provided as a service in a cloud environment.

12. The computer-implemented method of claim 1, further comprising deploying a system for selecting a parking space and providing navigation direction to the selected parking space, comprising providing a computer infrastructure operable to perform the steps of claim 1.

13. A computer program product for selecting a parking space and providing navigation direction to the selected parking space, the computer program product comprising a computer readable storage medium having program instructions embodied therewith, the program instructions executable by a computing device to cause the computing device to:
- receive vehicle identification information for a vehicle that is entering a parking facility;
- identify a driver profile and vehicle information based on the vehicle identification information, wherein the driver profile identifies criteria for scoring and selecting a parking space;
- determine attributes of one or more open parking spaces in the parking facility when the vehicle enters the parking facility, wherein the attributes are determined by analyzing image data associated with the parking facility by applying pixel-based classification to the image data;
- score each of the one or more open parking spaces based on the attributes, the driver profile, and the vehicle information;
- output information regarding the scored one or more open parking spaces; and
- determine navigation directions from the vehicle to a selected parking space, of the one or more open parking spaces, wherein the determining the navigation directions is based on pedestrian or vehicle traffic within the parking facility, the image data, and navigation directions previously provided to a different vehicle.

14. The computer program product of claim 13, wherein the program instructions further cause the computing device to:
- output the determined navigation directions to a user device or vehicle interface system associated with the driver.

15. The computer program product of claim 13, wherein the vehicle identification information is at least one selected from the group consisting of: a radio frequency identifier (RFID), a license plate number, and a vehicle identification number (VIN).

16. The computer program product of claim 13, wherein the pedestrian or vehicle traffic within the parking facility is predicted based on the image data, wherein the image data is received by a camera device associated with the parking facility.

17. The computer program product of claim 13, wherein the program instructions further cause the computing device to:
- receive the image data; and
- identify the one or more open parking spaces based on the image data,
wherein the program instructions to determine the attributes of the one or more open parking spaces cause the computing device to determine the attributes of the one or more open parking spaces based on identifying the one or more open parking spaces.

18. The computer program product of claim 13, wherein the program instructions to score the one or more open parking spaces cause the computing device to score the one or more open parking spaces based on weightings of the criteria identified in the driver profile.

19. A system comprising:
- a CPU, a computer readable memory and a computer readable storage medium associated with a computing device;
- program instructions to receive image data associated with a parking facility;
- program instructions to receive vehicle identification information for a vehicle that is entering the parking facility;
- program instructions to identify a driver's driver profile and vehicle information based on the vehicle identification information, wherein the driver profile identifies criteria for scoring and selecting a parking space based on attributes of parking spaces in which the driver previously parked;
- program instructions to identify one or more open parking spaces based on the image data when the vehicle enters the parking facility;
- program instructions to determine attributes of the one or more open parking spaces, wherein the attributes are determined by analyzing the image data by applying pixel-based classification to the image data;
- program instructions to score each of the one or more open parking spaces based on the attributes, the driver profile, and the vehicle information;
- program instructions to receive a selection of a particular one of the one or more parking spaces based on the scoring; and
- program instructions to determine navigation directions from the vehicle to the selected parking space, wherein the determining the navigation directions is based on pedestrian or vehicle traffic within the parking facility, the image data, and navigation directions previously provided to a different vehicle,
wherein the program instructions are stored on the computer readable storage medium for execution by the CPU via the computer readable memory.

20. The system of claim 19, further comprising:
- program instructions to output the determined navigation directions to a user device or vehicle interface system associated with the driver.

* * * * *